United States Patent
Keyes et al.

(10) Patent No.: US 12,042,933 B2
(45) Date of Patent: Jul. 23, 2024

(54) NESTED LINEAR STROKE MULTIPLIERS FOR ROBOT MANIPULATORS

(71) Applicant: Kindred Systems Inc., San Francisco, CA (US)

(72) Inventors: Nicholas Keyes, San Francisco, CA (US); David Gabriel Hallock, San Francisco, CA (US); Thomas John Hummel, San Francisco, CA (US); Jun Jeong, San Francisco, CA (US); Sara Wojciechowski, San Francisco, CA (US); Bryan Whittington, San Francisco, CA (US)

(73) Assignee: Ocado Innovation Limited, Hatfield (GB)

( * ) Notice: Subject to any disclaimer, the term of this patent is extended or adjusted under 35 U.S.C. 154(b) by 715 days.

(21) Appl. No.: 16/752,358

(22) Filed: Jan. 24, 2020

(65) Prior Publication Data
US 2020/0238506 A1    Jul. 30, 2020

Related U.S. Application Data

(60) Provisional application No. 62/796,331, filed on Jan. 24, 2019.

(51) Int. Cl.
     *B25J 18/02*      (2006.01)
     *B25J 9/10*      (2006.01)
     *B25J 15/06*      (2006.01)

(52) U.S. Cl.
     CPC ............ *B25J 18/025* (2013.01); *B25J 9/102* (2013.01); *B25J 9/104* (2013.01); *B25J 15/0616* (2013.01)

(58) Field of Classification Search
CPC ...... B25J 9/104; B25J 15/0616; B25J 18/025; B25J 9/102; B25J 15/00–12; B25J 18/00–06; F16H 19/0663
See application file for complete search history.

(56) References Cited

U.S. PATENT DOCUMENTS

| 4,094,381 | A | 6/1978 | Wilkerson |
| 4,534,697 | A * | 8/1985 | Poncet ............... B25J 9/104 74/110 |
| 8,757,690 | B2 | 6/2014 | Gao et al. |
| 2008/0093371 | A1 * | 4/2008 | Ubidia ............... B25J 9/041 901/14 |

(Continued)

FOREIGN PATENT DOCUMENTS

| DE | 10028106 A1 * | 12/2001 | .......... B25J 15/0616 |
| DE | 102013105383 B3 * | 7/2014 | .......... B25J 15/0061 |

(Continued)

*Primary Examiner* — Joseph Brown
(74) *Attorney, Agent, or Firm* — Seed IP Law Group LLP

(57) ABSTRACT

A robotic manipulator includes a first stage, a second stage, a third stage, and an actuator that actuates movement of the second stage with respect to the first stage. Movement of the second stage with respect to the first stage passively drives movement of the third stage with respect to the second stage. In some embodiments, the passive driving is achieved using one or more cables. In other embodiments, the passive driving is achieved using rack and pinion components. The robotic manipulator may further include additional stages, wherein movement of preceding stages passively drives movement of succeeding stages.

6 Claims, 13 Drawing Sheets

(56) References Cited

U.S. PATENT DOCUMENTS

2008/0282821  A1 *  11/2008  Tokumitsu ............. B25J 18/025
                                                    74/25
2021/0170587  A1 *   6/2021  Tanishima ............... B25J 9/104

FOREIGN PATENT DOCUMENTS

| KR | 20100135626 A | * | 12/2010 | |
|----|---------------|---|---------|---|
| SE | 443942 B | * | 3/1986 | |
| WO | WO-2010002044 A1 | * | 1/2010 | ............ B25J 18/025 |
| WO | WO-2010101176 A1 | * | 9/2010 | ........... A61B 6/4464 |

* cited by examiner

NESTED LINEAR STROKE MULTIPLIERS FOR ROBOT MANIPULATORS

BACKGROUND

Technical Field

The present disclosure is directed generally to nested linear stroke multipliers for robot manipulators.

Description of the Related Art

Robotic end-of-arm tooling (EOAT) and robotic end effectors take many forms. Generally speaking, an end effector is a component at the terminal, distal end of a robotic arm and is configured to perform one or more of various actions, and may take the form of a gripper, a cutting tool, or other device. Robotic manipulators, which represent one type of robotic end effector, are generally configured to grasp or otherwise hold objects and move the objects in space. Robotic manipulators may be impactive robotic manipulators, which typically use jaws, fingers, or other similar mechanisms to grasp an object to be moved, such that the object is held by frictional forces. Robotic manipulators may also be astrictive robotic manipulators, which typically use vacuum, magnetic, or electrical devices, or other similar mechanisms, to grasp an object to be moved, such that the object is held by attractive forces such as suction, magnetism, or electroadhesion.

There is a general need in the art for more effective robotic end effectors and robotic manipulators. Effectiveness may depend on a variety of factors. For example, an end effector capable of holding an object with greater force, or more securely, may be more effective. As another example, an end effector capable of holding an object with a reduced chance of damaging the object, and/or that is capable of holding a wider range of objects, may also be more effective. As one additional example, an end effector of simpler construction, that is simpler to actuate and use, and/or that is simpler to maintain or replace, may also be more effective.

BRIEF SUMMARY

A robotic manipulator may be summarized as comprising: a first stage; a second stage; a third stage; an actuator coupled to the first stage and to the second stage to actuate movement of the second stage with respect to the first stage; and a cable having a first end coupled to the first stage, a second end coupled to the third stage, and an intermediate portion between the first end and the second end engaged with the second stage such that movement of the second stage with respect to the first stage passively drives movement of the third stage with respect to the second stage.

The movement of the second stage with respect to the first stage may be linear movement and the movement of the third stage with respect to the second stage may be linear movement. The linear movement of the second stage with respect to the first stage may be in the same direction as the linear movement of the third stage with respect to the second stage. The movement of the second stage with respect to the first stage may be extension of the second stage with respect to the first stage and the movement of the third stage with respect to the second stage may be extension of the third stage with respect to the second stage. The robotic manipulator may further comprise: a fourth stage; and a second cable having a first end coupled to the second stage, a second end coupled to the fourth stage, and an intermediate portion between the first end and the second end engaged with the third stage such that extension of the third stage with respect to the second stage passively drives extension of the fourth stage with respect to the third stage. The movement of the second stage with respect to the third stage may be retraction of the second stage with respect to the first stage and the movement of the third stage with respect to the second stage may be retraction of the third stage with respect to the second stage. The robotic manipulator may further comprise: a fourth stage; and a second cable having a first end coupled to the second stage, a second end coupled to the fourth stage, and an intermediate portion between the first end and the second end engaged with the third stage such that retraction of the third stage with respect to the second stage passively drives retraction of the fourth stage with respect to the third stage. The intermediate portion of the cable may be positioned within a groove in the second stage. The groove may be located within a pulley in the second stage. The robotic manipulator may further comprise: a suction cup; wherein movement of the second stage with respect to the first stage drives movement of the suction cup with respect to the first stage; and wherein movement of the third stage with respect to the second stage drives movement of the suction cup with respect to the first stage.

A robotic manipulator may be summarized as comprising: a first stage; a second stage; a third stage; an actuator coupled to the first stage and to the second stage to actuate linear movement of the second stage with respect to the first stage; a first driven pinion coupled to the second stage; a first rack rigidly coupled to the first stage and engaged with the first driven pinion such that linear movement of the first driven pinion with respect to the first stage and the first rack drives rotation of the first driven pinion with respect to the second stage; and a second rack rigidly coupled to the third stage and engaged with the first driven pinion such that rotation of the first driven pinion with respect to the second stage drives linear movement of the second rack and the third stage with respect to the second stage. The linear movement of the second rack and the third stage with respect to the second stage may be in the same direction as the linear movement of the second stage with respect to the first stage. The actuator may include: an actuated pinion coupled to the first stage; and a third rack rigidly coupled to the second stage and engaged with the actuated pinion such that rotation of the actuated pinion drives linear movement of the third rack, the second stage, and the first driven pinion with respect to the first stage. The robotic manipulator may further comprise: a fourth stage; a second driven pinion coupled to the third stage; a third rack rigidly coupled to the second stage and engaged with the second driven pinion such that linear movement of the second driven pinion with respect to the second stage and the third rack drives rotation of the second driven pinion with respect to the third stage; and a fourth rack rigidly coupled to the fourth stage and engaged with the second driven pinion such that rotation of the second driven pinion with respect to the third stage drives linear movement of the fourth rack and the fourth stage with respect to the third stage.

A method may be summarized as comprising: actuating a second stage of a robotic manipulator to extend linearly with respect to a first stage of the robotic manipulator, wherein linear extension of the second stage with respect to the first stage passively drives linear extension of a third stage of the robotic manipulator with respect to the second stage of the robotic manipulator; engaging a suction cup at a distal end of the robotic manipulator with an object to be manipulated; supplying a vacuum to the suction cup; manipulating the object with the robotic manipulator; removing the vacuum from the suction cup; and actuating the second stage of the robotic manipulator to retract linearly with respect to the first stage of the robotic manipulator, wherein linear retraction of the second stage with respect to the first stage passively drives linear retraction of a third stage of the robotic manipulator with respect to the second stage of the robotic manipulator.

The method may be controlled by a human operator. The method may be automated and performed without the control of a human operator. The method may be performed based on reinforced learning techniques. Linear extension of the third stage with respect to the second stage may be in the same direction as the linear extension of the second stage with respect to the first stage and linear retraction of the third stage with respect to the second stage may be in the same direction as the linear retraction of the second stage with respect to the first stage. Driving linear extension of the third stage with respect to the second stage may passively drive linear extension of a fourth stage of the robotic manipulator with respect to the third stage of the robotic manipulator; and driving linear retraction of the third stage with respect to the second stage may passively drive linear retraction of the fourth stage of the robotic manipulator with respect to the third stage of the robotic manipulator.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
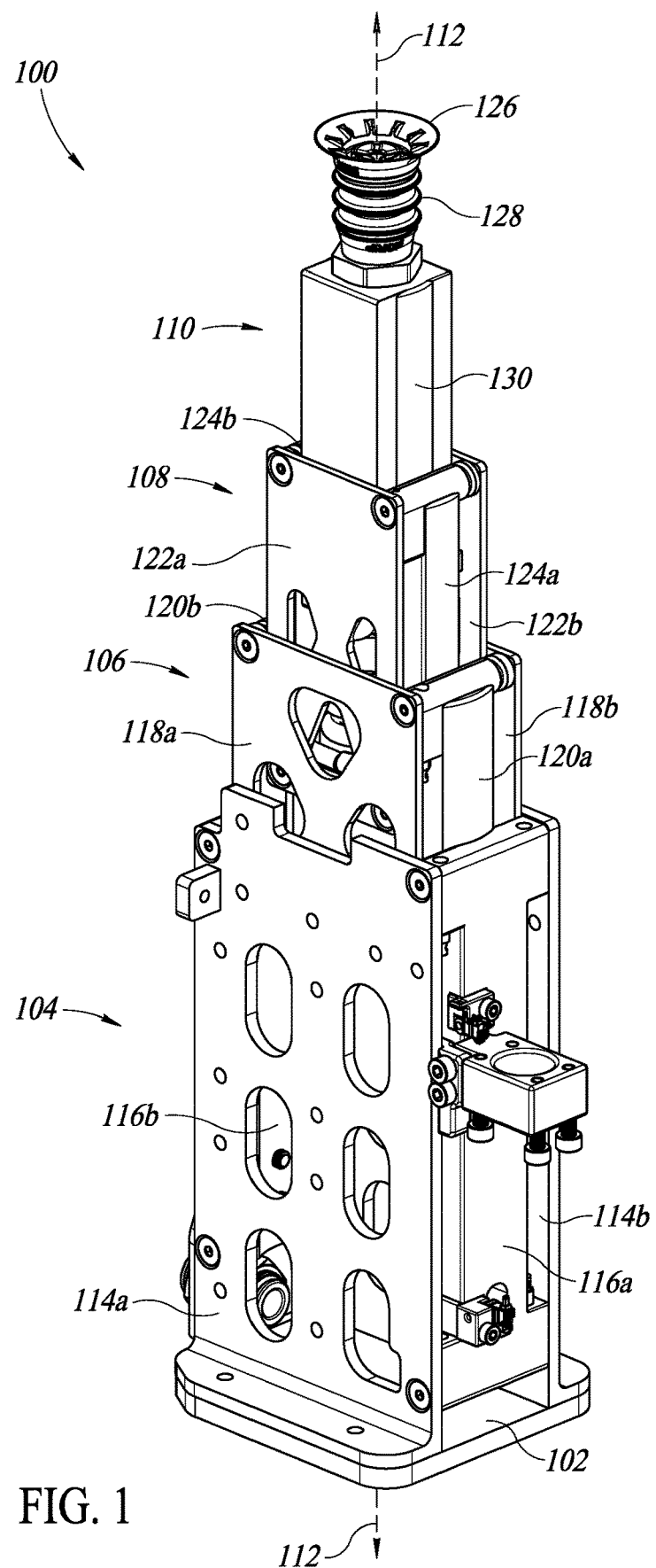
FIG. 1 illustrates a perspective view of a system including a nested linear stroke multiplier for a robotic manipulator, according to an embodiment of the present disclosure.

FIG. 1 illustrates a system 100 including a robotic end effector in the form of an astrictive robotic manipulator, which is capable of drawing a vacuum to apply forces to objects to be manipulated by the robotic end effector. As illustrated in FIG. 1, the system 100 includes a base plate 102, which can be mounted to a terminal end portion of a robotic arm. In the context of the present disclosure, the base plate 102 can be considered as a stationary component, and the movement of various other components of the system 100 can be thought of as being with respect to the base plate 102. In practice, however, as the base plate 102 is coupled to the terminal end portion of a robotic arm, the base plate 102 can also be moved about in space, such as with respect to a ground surface or with respect to an object to be manipulated by the robotic arm and the system 100. Nevertheless, movement of other components of the system 100 with respect to the base plate 102 remain the same whether the base plate 102 is stationary or moving.

As also illustrated in FIG. 1, the system 100 includes four stages that can be actuated to move with respect to one another in a telescoping manner. In particular, the system 100 includes a first, base stage 104, which includes the base plate 102 and therefore may be considered stationary, a second stage 106, which can be actuated to move or travel linearly with respect to the first stage 104, a third stage 108, which can be actuated to move or travel linearly with respect to the second stage 106, and a fourth stage 110, which can be actuated to move or travel linearly with respect to the third stage 108.

More specifically, the first stage 104 may be coupled to a terminal end portion of a robotic arm, such as by the base plate 102, and may be considered stationary in the context of the present disclosure, as discussed above with respect to the base plate 102. The second stage 106 is positioned partially inside the first stage 104 and is coupled to the first stage 104 such that it can be actuated to extend or translate linearly outward from the first stage 104, in a direction away from the base plate 102, and/or to retract or translate linearly into the first stage 104, in a direction toward the base plate 102. The third stage 108 is positioned partially inside the second stage 106 and is coupled to the second stage 106 such that it can be actuated to extend or translate linearly outward from the second stage 106, in a direction away from the base plate 102, and/or to retract or translate linearly into the second stage 106, in a direction toward the base plate 102. The third stage 110 is positioned partially inside the second stage 108 and is coupled to the third stage 108 such that it can be actuated to extend or translate linearly outward from the third stage 108, in a direction away from the base plate 102, and/or to retract or translate linearly into the third stage 108, in a direction toward the base plate 102.

As illustrated in FIG. 1, the stages of the system 100 are configured to travel linearly with respect to one another along a common longitudinal axis 112 that extends generally perpendicularly to the base plate 102 and in a direction of extension of the system 100. Thus, actuating the stages of the system 100 to translate linearly outward from one another increases the overall length of the system 100 along the axis 112, and actuating the stages of the system 100 to translate linearly into one another decreases the overall length of the system 100 along the axis 112.

As also illustrated in FIG. 1, each of the first stage 104, the second stage 106, and the third stage 108 includes a structural frame that supports other components and engages with the structural frames of the other stages of the system 100. For example, the first stage 104 includes a first side frame component 114a that is rigidly coupled to a first side portion of the base plate 102 and a second side frame component 114b that is coupled to a second side portion of the base plate 102 opposite to the first side portion thereof. The first side frame component 114a is opposed to, and extends generally parallel to, the second side frame component 114b, such that an interior of the first stage 104 is defined in the space between the first side frame component 114a and the second side frame component 114b. As another example, the first stage 104 includes a first end frame component 116a that is rigidly coupled to a first end portion of the first side frame component 114a and a first end portion of the second side frame component 114b, and a second end frame component 116b that is coupled to a second end portion of the first side frame component 114a that is opposite to the first end portion thereof and a second end portion of the second side frame component 114b that is opposite to the first end portion thereof. The first end frame component 116a is opposed to, and extends generally parallel to, the second end frame component 116b, such that the interior of the first stage 104 is also defined in the space between the first end frame component 116a and the second end frame component 116b.

The second stage 106 is positioned partially inside the interior of the first stage 104 defined between the first side frame component 114a and the second side frame component 114b and between the first end frame component 116a and the second end frame component 116b. The second stage 106 includes a first side frame component 118a that is adjacent to the first side frame component 114a and a second side frame component 118b that is adjacent to the second side frame component 114b. The first side frame component 118a is opposed to, and extends generally parallel to, the second side frame component 118b, such that an interior of the second stage 106 is defined in the space between the first side frame component 118a and the second side frame component 118b. The second stage 106 also includes a first end frame component 120a that is adjacent to the first end frame component 116a and that is rigidly coupled to a first end portion of the first side frame component 118a and a first end portion of the second side frame component 118b, and a second end frame component 120b that is adjacent to the second end frame component 116b and that is coupled to a second end portion of the first side frame component 118a that is opposite to the first end portion thereof and a second end portion of the second side frame component 118b that is opposite to the first end portion thereof. The first end frame component 120a is opposed to, and extends generally parallel to, the second end frame component 120b, such that the interior of the second stage 106 is also defined in the space between the first end frame component 120a and the second end frame component 120b.

The third stage 108 is positioned partially inside the interior of the second stage 106 defined between the first side frame component 118a and the second side frame component 118b and between the first end frame component 120a and the second end frame component 120b. The third stage 108 includes a first side frame component 122a that is adjacent to the first side frame component 118a and a second side frame component 122b that is adjacent to the second side frame component 118b. The first side frame component 122a is opposed to, and extends generally parallel to, the second side frame component 122b, such that an interior of the third stage 108 is defined in the space between the first side frame component 122a and the second side frame component 122b. The third stage 108 also includes a first end frame component 124a that is adjacent to the first end frame component 120a and that is rigidly coupled to a first end portion of the first side frame component 122a and a first end portion of the second side frame component 122b, and a second end frame component 124b that is adjacent to the second end frame component 120b and that is coupled to a second end portion of the first side frame component 122a that is opposite to the first end portion thereof and a second end portion of the second side frame component 122b that is opposite to the first end portion thereof. The first end frame component 124a is opposed to, and extends generally parallel to, the second end frame component 124b, such that the interior of the third stage 108 is also defined in the space between the first end frame component 124a and the second end frame component 124b.

The fourth stage 110 is positioned partially inside the interior of the third stage 108 defined between the first side frame component 122a and the second side frame component 122b and between the first end frame component 124a and the second end frame component 124b. The fourth stage 110 includes a generally rectangular prism-shaped block 130 that supports a suction cup 126 via a bellows 128. In use, a vacuum can be supplied to the rectangular prism-shaped block 130, through an interior thereof to the bellows 128, and through an interior thereof to an interior of the suction cup 126. Such a vacuum may be used to improve control of, and/or increase, an attractive, astrictive, suction force applied by the robotic manipulator to an object to be manipulated.

While the system 100 is described and illustrated as having the suction cup 126, the system 100 may have any other component(s), such as actuator(s), such as robotic fingers, grippers, cameras, probes, blades, sensors, drills, screwdrivers, etc., in place of the suction cup 126. In some embodiments, the system 100 may have two of such components (e.g., two suction cups, two blades, or one suction cup and one blade) coupled to the block 130. Furthermore, in some embodiments, a larger system may include two or more of the systems 100, each with one or more of such components coupled to the respective block 130 thereof.

Figure 2:
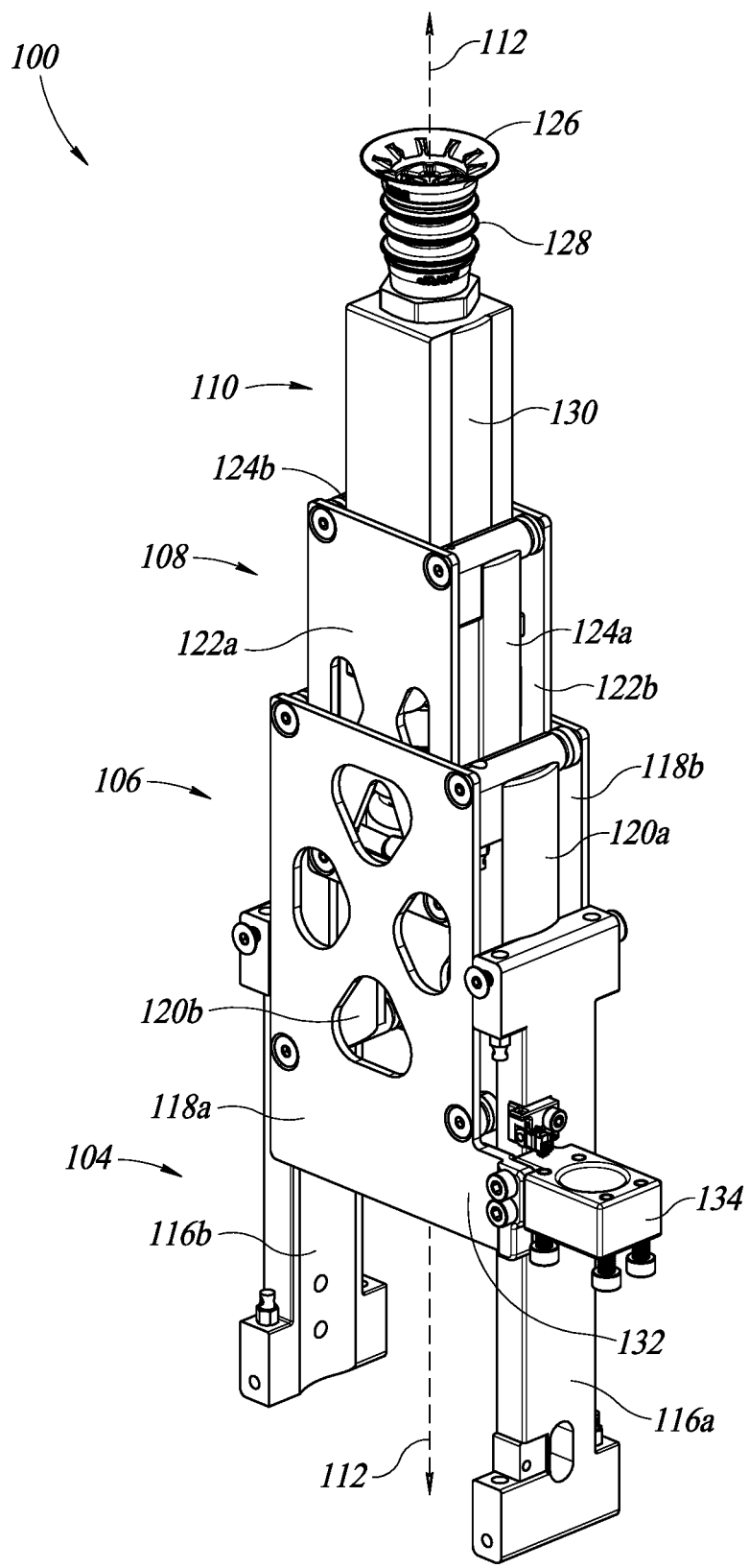
FIG. 2 illustrates a perspective view of the system of FIG. 1 with several components removed, according to an embodiment of the present disclosure.

FIG. 2 illustrates the system 100 with the first side frame component 114a of the first stage 104, the second side frame component 114b of the first stage, and associated components removed, such that the first end frame component 116a of the first stage 104, second end frame component 116b of the first stage 104, and other components are more clearly visible. As illustrated in FIGS. 1 and 2, a gap or a slot exists between the first side frame component 114a of the first stage 104 and the first end frame component 116a of the first stage 104, and the first side frame component 118a of the second stage 106 includes a flange 132 that extends out of the first stage 104 through the slot, when the system 100 is fully assembled. FIG. 2 further illustrates that the second stage 106 includes a socket or other fitting 134 rigidly coupled to the flange 132.

When the system 100 is in use, an actuator can be rigidly coupled to the terminal end portion of a robotic arm, or to the base plate 102, or to the first, base stage 104, and can include a driven component coupled to, and/or seated within, the fitting 134. Thus, the actuator may be configured to actuate the second stage 106 to move linearly along the axis 112, inward and/or outward, with respect to the first stage 104. In some embodiments, such an actuator may be a linear piston, a motor, a servomotor, a lead screw, a rack and pinion gear set, or a sprocket and roller chain set, which may be useful in relatively large systems because it may provide a relatively small package size. Such actuators may be powered electrically, hydraulically, mechanically, or pneumatically.

Figure 3:
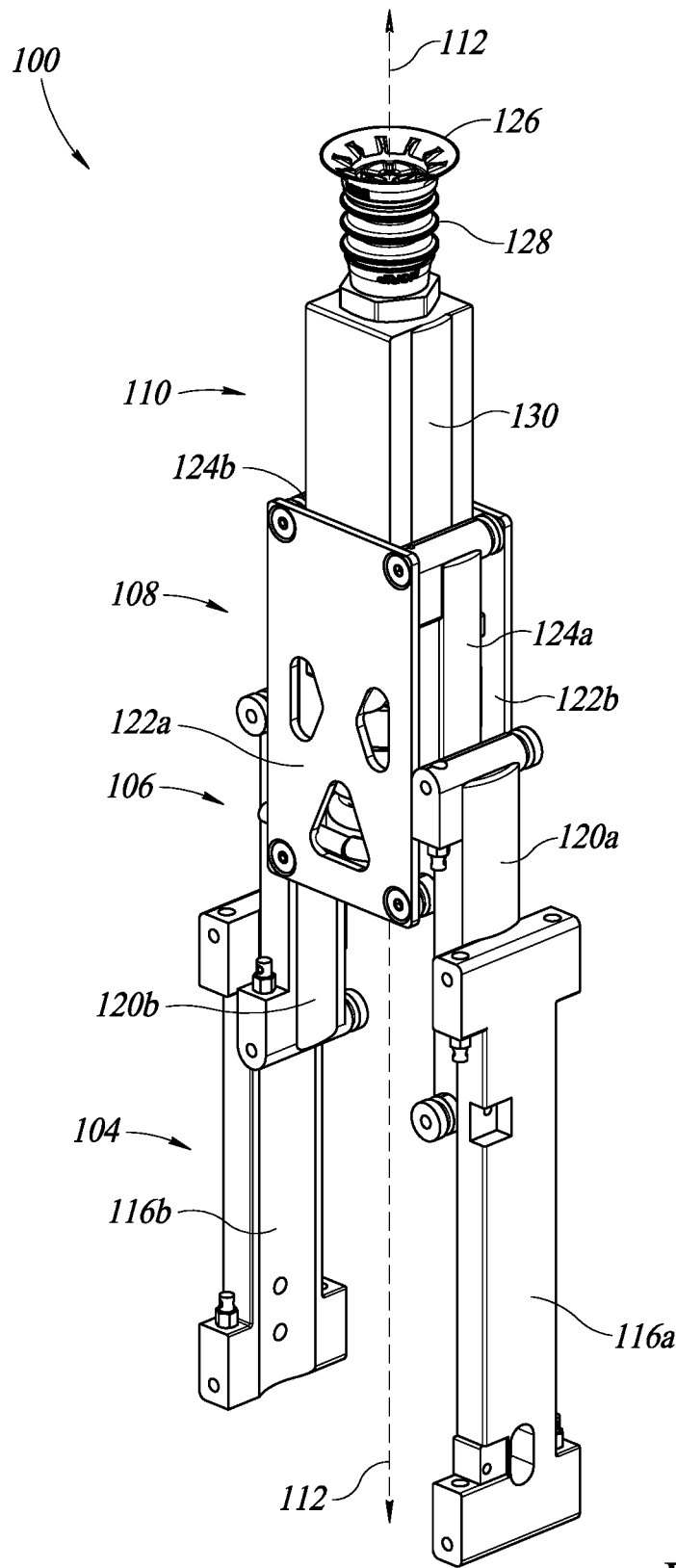
FIG. 3 illustrates a perspective view of the system of FIGS. 1 and 2 with additional components removed, according to an embodiment of the present disclosure.

FIG. 3 illustrates the system 100 with the first side frame component 114a of the first stage 104, the second side frame component 114b of the first stage 104, the first side frame component 118a of the second stage 106, the second side frame component 118b of the second stage 106, and associated components removed. Thus, the first end frame component 116a of the first stage 104, second end frame component 116b of the first stage, first end frame component 120a of the second stage 106, second end frame component 120b of the second stage 106, and other components are more clearly visible in FIG. 3.

Figure 4:
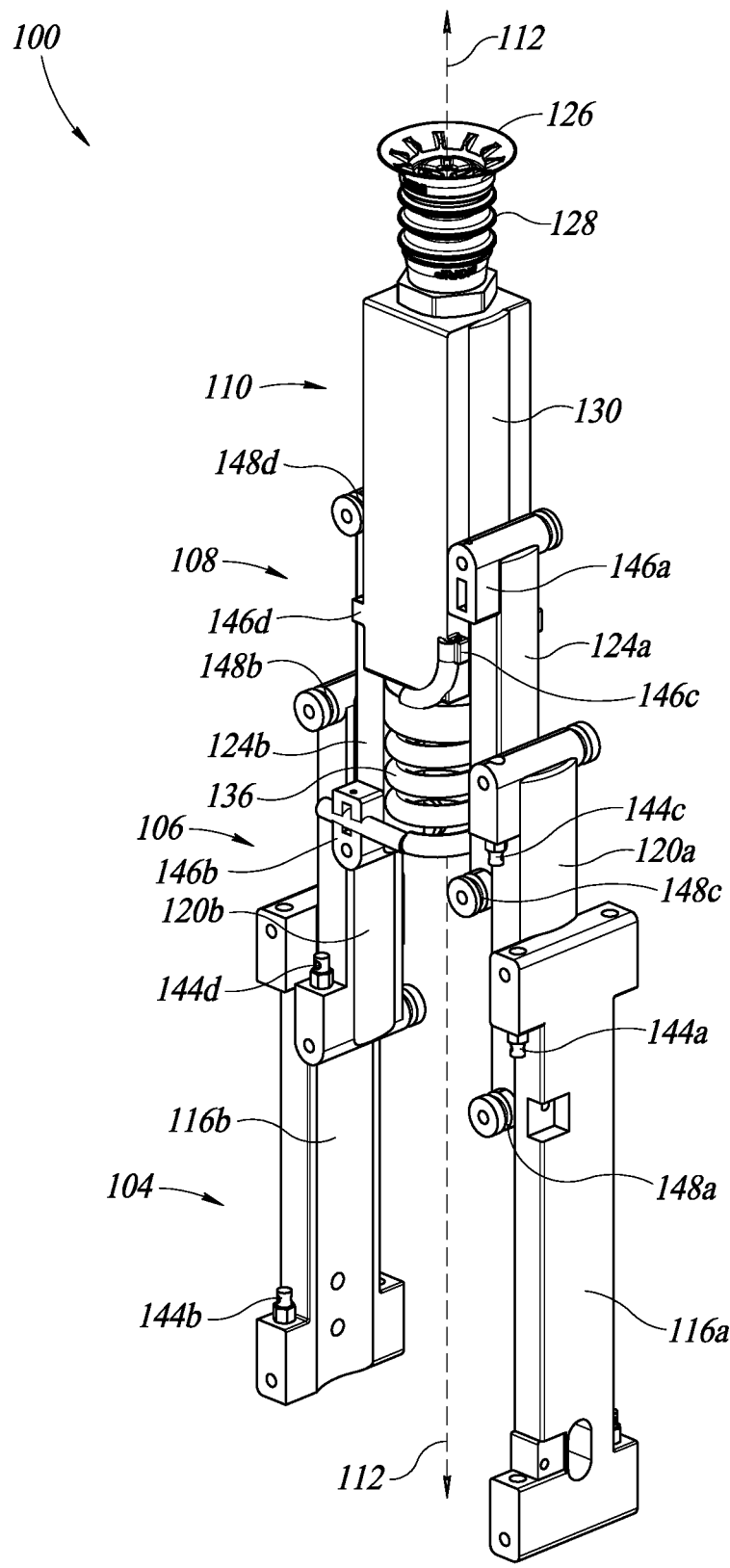
FIG. 4 illustrates a perspective view of the system of FIGS. 1-3 with additional components removed, according to an embodiment of the present disclosure.
Figure 5:
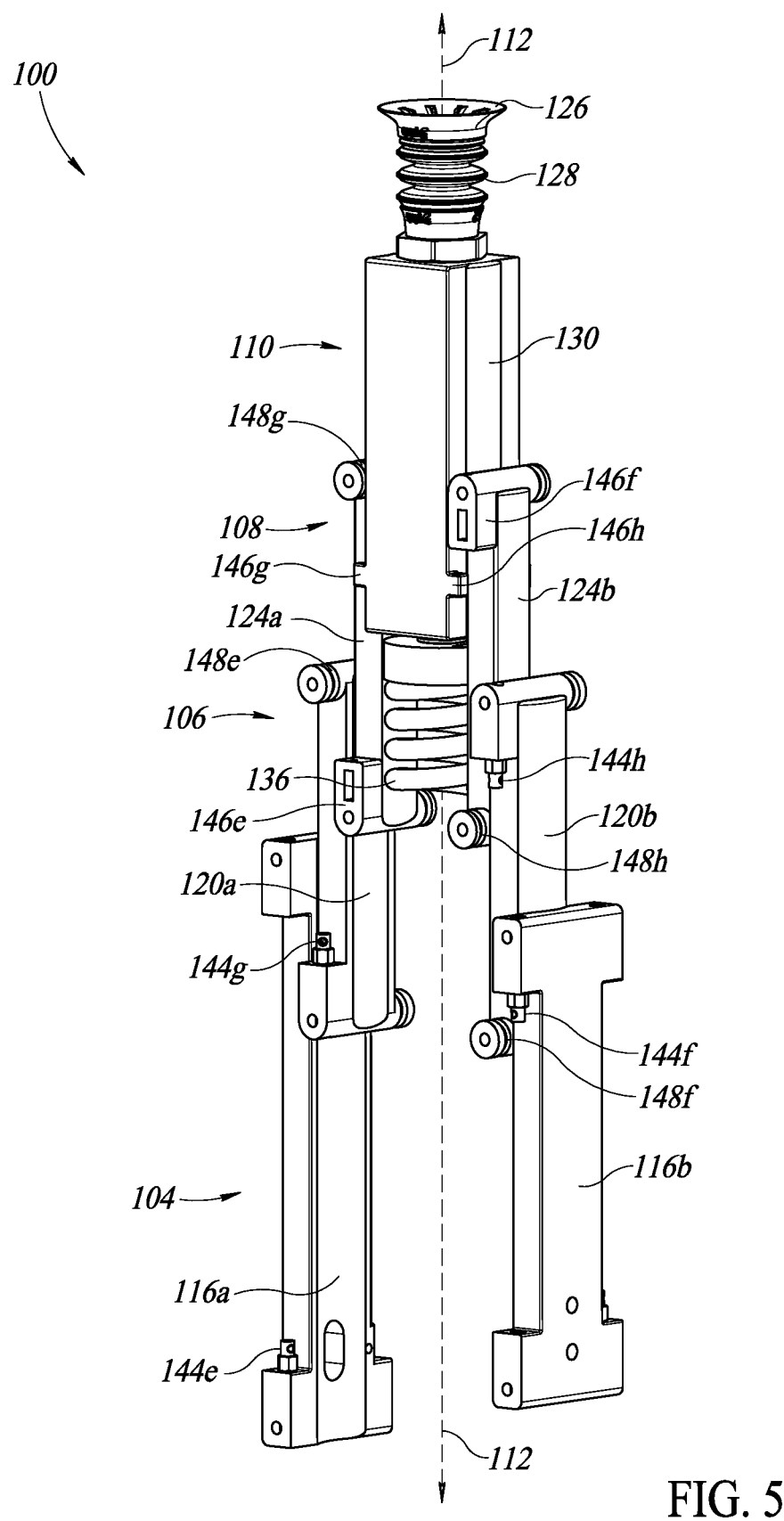
FIG. 5 illustrates another perspective view of the system of FIGS. 1-4 as it is illustrated in FIG. 4, according to an embodiment of the present disclosure.
Figure 6:
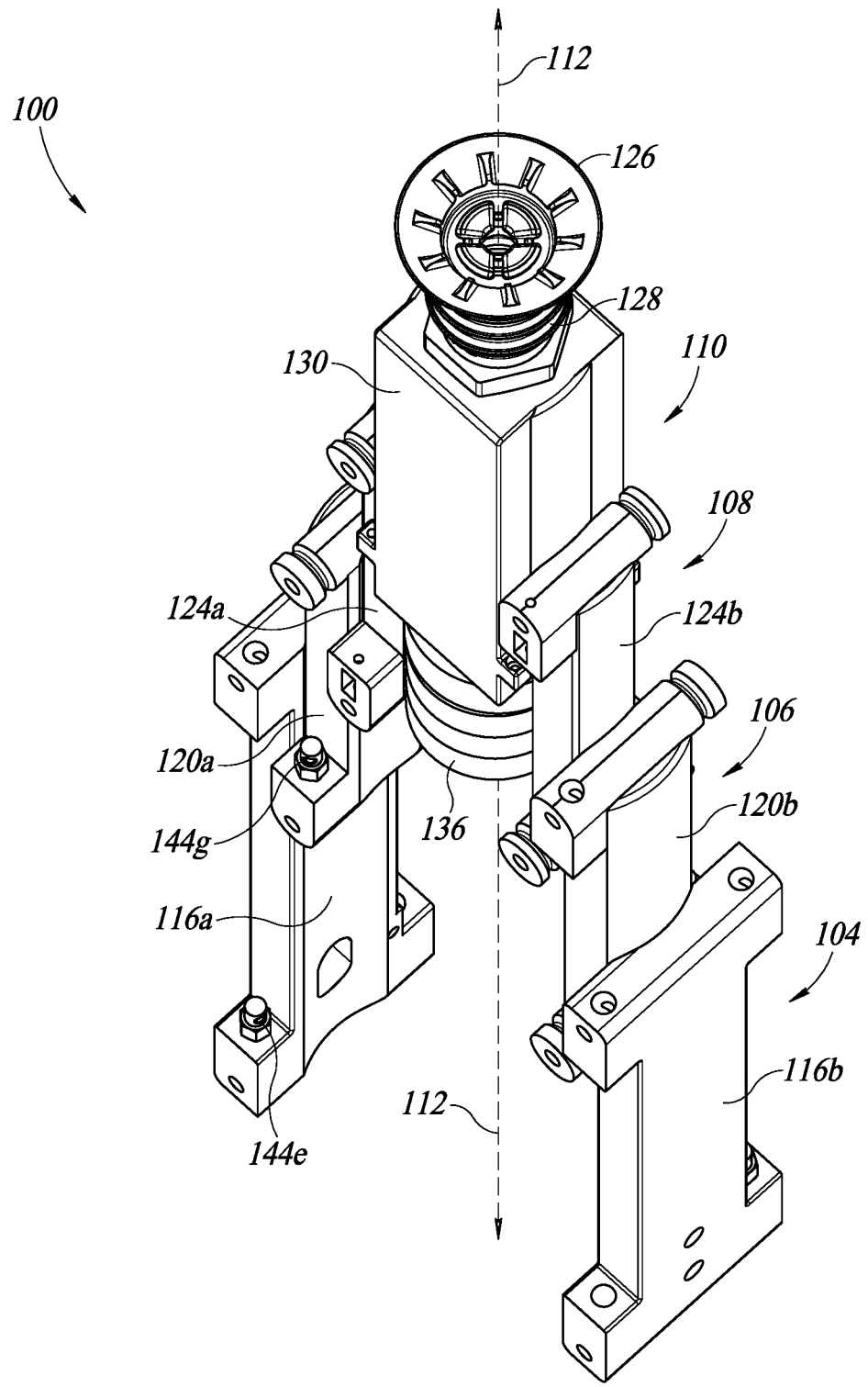
FIG. 6 illustrates another perspective view of the system of FIGS. 1-5 as it is illustrated in FIGS. 4 and 5, according to an embodiment of the present disclosure.

FIGS. 4, 5, and 6 illustrate the system 100 with the first side frame component 114a of the first stage 104, the second side frame component 114b of the first stage 104, the first side frame component 118a of the second stage 106, the second side frame component 118b of the second stage 106, the first side frame component 122a of the third stage 108, the second side frame component 122b of the third stage 108, and associated components removed. Thus, the first end frame component 116a of the first stage 104, second end frame component 116b of the first stage, first end frame component 120a of the second stage 106, second end frame component 120b of the second stage 106, first end frame component 124a of the third stage 108, second end frame component 124b of the third stage 108, and other components are more clearly visible in FIGS. 4, 5, and 6. As also illustrated in FIGS. 4, 5, and 6, the system 100 includes a coiled conduit 136 that is coupled to the rectangular prism-shaped block 130 and through which a vacuum can be supplied to the block 130, bellows 128, and suction cup 126. In some embodiments, the coiled conduit 136 may have a diameter of 25 mm, and may be flexible or compliant, with a first end thereof coupled to the block 130 as illustrated in FIGS. 4-6, and a second end thereof opposite its first end coupled to a port 150 (see FIG. 14) in a proximal end portion of the first stage 104. In such embodiments, the coiled conduit 136 can stretch as the system 100 extends, and contract again as the system 100 retracts, to facilitate movement of the stages 104, 106, 108, and 110 with respect to one another.

Figure 7:
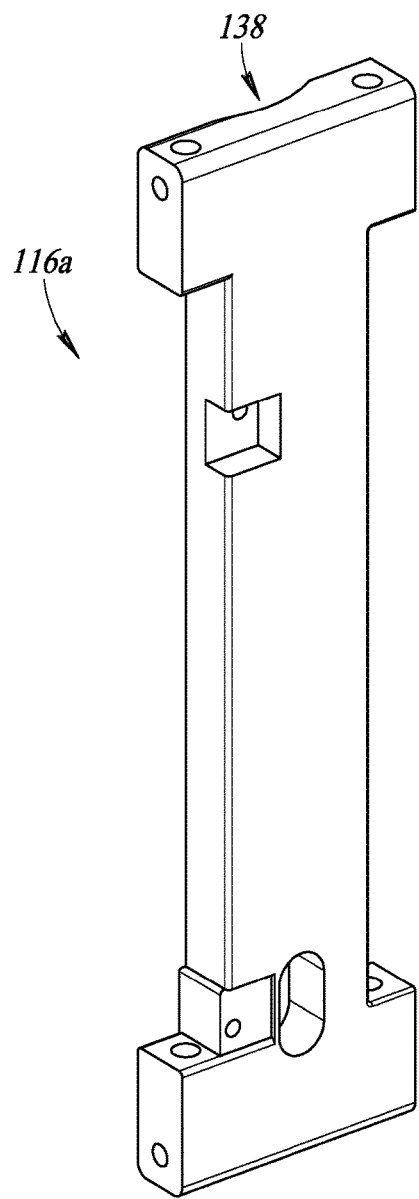
FIG. 7 illustrates a perspective view of a frame component of the system of FIGS. 1-6, according to an embodiment of the present disclosure.
Figure 8:
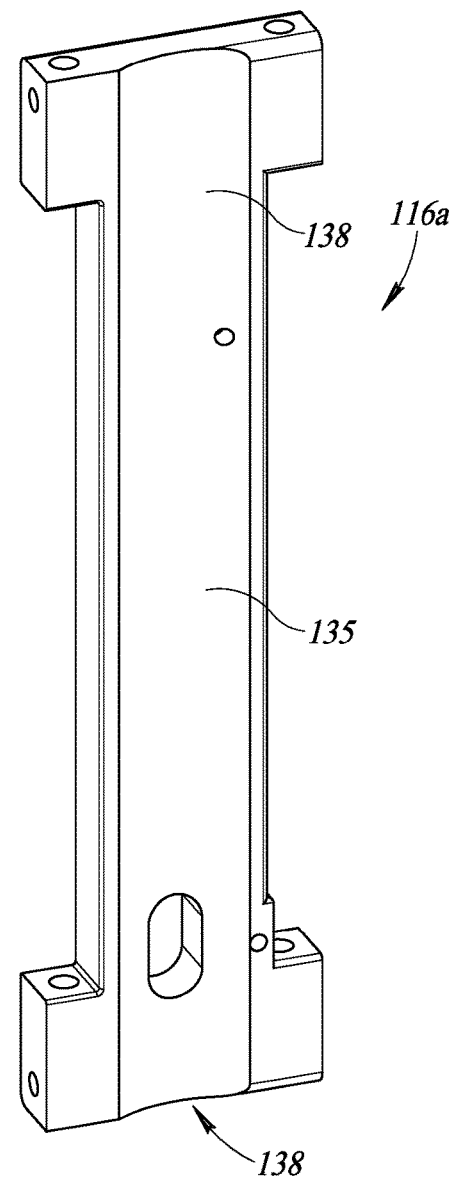
FIG. 8 illustrates another perspective view of the frame component of FIG. 7, according to an embodiment of the present disclosure.

FIG. 7 illustrates a perspective view of an outer surface, and FIG. 8 illustrates a perspective view of an inner surface, of the first end frame component 116a of the first stage 104 of the system 100. As used herein, the term "inner surface" means a surface of a component of a stage that faces toward the interior of the stage, and the term "outer surface" means a surface of a component of a stage that faces away from the interior of the stage. As illustrated in FIGS. 7 and 8, an inner surface of the first end frame component 116a includes a groove 138 that extends along a length of the first end frame component 116a in a direction parallel to the axis 112 from a first end of the first end frame component 116a to a second end of the first end frame component 116a opposite its first end. As illustrated in FIGS. 7 and 8, the groove 138 is relatively wide and shallow (e.g., its width is greater than its depth, or greater than twice its depth, or greater than three times its depth, or greater than four times its depth, or greater than five times its depth). Further, the groove 138 has a shape, such as is seen when the first end frame component 116a is viewed on-end, that is, along an axis parallel to the axis 112, that forms a portion of a circle, with a constant radius of diameter.

An inner surface of the second end frame component 116b includes a groove corresponding to or having features matching those of the groove 138. Specifically, the groove of the second end frame component 116b extends along a length of the second end frame component 116b in a direction parallel to the axis 112 from a first end of the second end frame component 116b to a second end of the second end frame component 116b opposite its first end. The groove of the second end frame component 116b is relatively wide and shallow (e.g., its width is greater than its depth, or greater than twice its depth, or greater than three times its depth, or greater than four times its depth, or greater than five times its depth). Further, the groove of the second end frame component has a shape, such as is seen when the second end frame component 116b is viewed on-end, that is, along an axis parallel to the axis 112, that forms a portion of a circle, with a constant radius of diameter.

Figure 9:
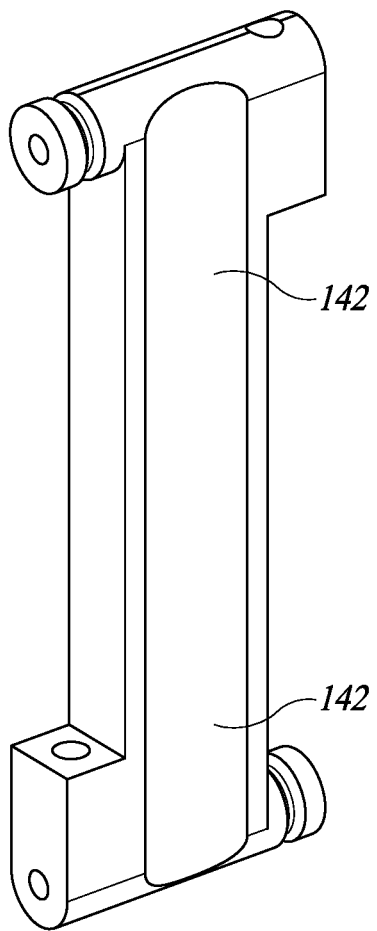
FIG. 9 illustrates a perspective view of another frame component of the system of FIGS. 1-6, according to an embodiment of the present disclosure.
Figure 10:
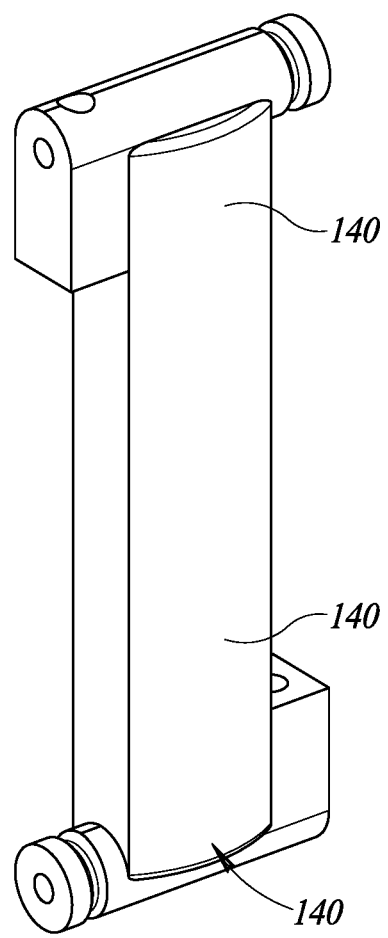
FIG. 10 illustrates another perspective view of the frame component of FIG. 9, according to an embodiment of the present disclosure.

FIG. 9 illustrates a perspective view of an inner surface, and FIG. 10 illustrates a perspective view of an outer surface, of an end frame component that is representative of the first and second end frame components of the second and third stages of the system 100. As illustrated in FIGS. 9 and 10, an inner surface of the end frame component illustrated in FIGS. 9 and 10 includes a groove 142 that extends along a length of the end frame component in a direction parallel to the axis 112 from a first end of the end frame component to a second end of the end frame component opposite its first end. As illustrated in FIGS. 9 and 10, the groove 142 is relatively wide and shallow (e.g., its width is greater than its depth, or greater than twice its depth, or greater than three times its depth, or greater than four times its depth, or greater than five times its depth). Further, the groove 142 has a shape, such as is seen when the end frame component is viewed on-end, that is, along an axis parallel to the axis 112, that forms a portion of a circle, with a constant radius of diameter. The groove 142 can have dimensions that match or are the same as corresponding dimensions of the groove 138.

As also illustrated in FIGS. 9 and 10, an outer surface of the end frame component illustrated in FIGS. 9 and 10 includes a ridge 140 that extends along a length of the end frame component in a direction parallel to the axis 112 from a first end of the end frame component to a second end of the end frame component opposite its first end. As illustrated in FIGS. 9 and 10, the ridge 140 is relatively wide and shallow (e.g., its width is greater than its depth, or greater than twice its depth, or greater than three times its depth, or greater than four times its depth, or greater than five times its depth). Further, the ridge 140 has a shape, such as is seen when the end frame component is viewed on-end, that is, along an axis parallel to the axis 112, that forms a portion of a circle, with a constant radius of diameter. The ridge 140 can have dimensions that match or are the same as corresponding dimensions of the grooves 138 and 142, such that the ridge 140 can be snugly fitted within one of the grooves 138, 142.

As illustrated in FIGS. 1-6, a surface of the rectangular prism-shaped block 130 that faces the first end frame component 124a of the third stage 108 and a surface of the rectangular prism-shaped block 130 that faces the second end frame component 124b of the third stage 108 each include a ridge that extends along a length of the block 130 in a direction parallel to the axis 112 from a first end of the block 130 to a second end of the block 130 opposite its first end. The ridges are relatively wide and shallow (e.g., their widths are greater than their depths, or greater than twice their depths, or greater than three times their depths, or greater than four times their depths, or greater than five times their depths). Further, the ridges each have a shape, such as is seen when the block 130 is viewed on-end, that is, along an axis parallel to the axis 112, that forms a portion of a circle, with a constant radius of diameter. The ridges can have dimensions that match or are the same as those of the ridge 140, and as corresponding dimensions of the grooves 138 and 142, such that the ridges can be snugly fitted within the grooves 138, 142.

As illustrated in FIGS. 1-6, the second stage 106 is positioned partially within the first stage 104 and with the ridges 140 of its first and second end frame components 120a, 120b positioned within the grooves 138 of the first and second end frame components 116a, 116b of the first stage 104. Thus, outer surfaces of the ridges 140 of the first and second end frame components 120a, 120b are engaged and in contact with inner surfaces of the grooves 138 of the first and second end frame components 116a, 116b. Such engagement allows the second stage to translate linearly along the axis 112 with respect to the first stage.

As illustrated in FIGS. 1-6, the third stage 108 is positioned partially within the second stage 106 and with the ridges 140 of its first and second end frame components 124a, 124b positioned within the grooves 142 of the first and second end frame components 120a, 120b of the second stage 106. Thus, outer surfaces of the ridges 140 of the first and second end frame components 124a, 124b are engaged and in contact with inner surfaces of the grooves 142 of the first and second end frame components 120a, 120b. Such engagement allows the third stage to translate linearly along the axis 112 with respect to the second stage.

As illustrated in FIGS. 1-6, the fourth stage 110 is positioned partially within the third stage 108 and with the ridges of its block 130 positioned within the grooves 142 of the first and second end frame components 124a, 124b of the third stage 108. Thus, outer surfaces of the ridges of the block 130 are engaged and in contact with inner surfaces of the grooves 142 of the first and second end frame components 124a, 124b. Such engagement allows the fourth stage to translate linearly along the axis 112 with respect to the third stage.

In some embodiments, the end frame components and the block 130 including the ridges (e.g., ridges 140) and the grooves (e.g., grooves 138 and 142) may be made of relatively lubricious materials, such as brass or polyoxymethylene (commercially available under the brand name DELRIN) to reduce friction between the components as the stages move relative to one another and therefore facilitate such movement by making it more efficient. In alternative embodiments, the stages may be engaged with one another using any suitable alternative mechanisms known in the art. In some specific alternative embodiments, the stages are adjustably engaged with one another by respective sets of roller bearings, which may be cylindrical roller bearings or ball bearings.

As illustrated in FIGS. 4 and 5 in particular, the system 100 includes a plurality of eye bolts 144 configured to couple cables or wires to the end frame components of the first, second, and third stages 104, 106, and 108, and to the block 130 of the fourth stage 110. For example, as illustrated in FIG. 4 in particular, the first end frame component 116a includes a first eye bolt 144a at a corner of the first end frame component 116a adjacent or proximal to the first side frame component 114a and distal from or opposite to the base plate 102 (that is, at a distal end of the first stage 104 with respect to the base plate 102), the second end frame component 116b includes a second eye bolt 144b at a corner of the second end frame component 116b adjacent or proximal to the first side frame component 114a and proximal to the base plate 102 (that is, at a proximal end of the first stage 104 with respect to the base plate 102), the first end frame component 120a includes a third eye bolt 144c at a corner of the first end frame component 120a adjacent or proximal to the first side frame component 118a and distal from or opposite to the base plate 102 (that is, at a distal end of the second stage 106 with respect to the base plate 102), and the second end frame component 120b includes a fourth eye bolt 144d at a corner of the second end frame component 120b adjacent or proximal to the first side frame component 118a and proximal to the base plate 102 (that is, at a proximal end of the second stage 106 with respect to the base plate 102).

Figure 11:
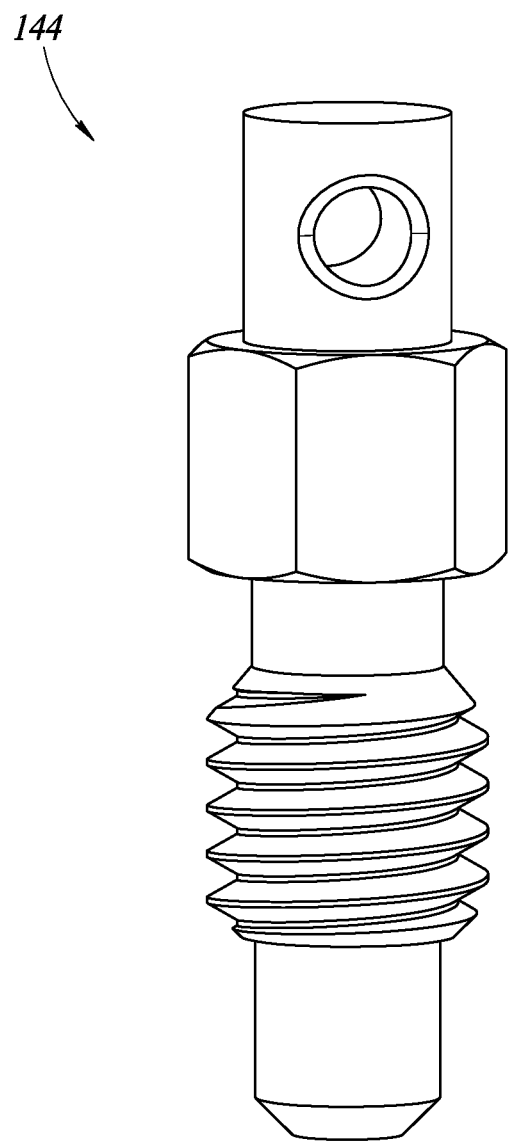
FIG. 11 illustrates a perspective view of an eye bolt of the system of FIGS. 1-6, according to an embodiment of the present disclosure.

As another example, as illustrated in FIG. 5 in particular, the first end frame component 116a includes a fifth eye bolt 144e at a corner of the first end frame component 116a adjacent or proximal to the second side frame component 114b and proximal to the base plate 102 (that is, at a proximal end of the first stage 104 with respect to the base plate 102), the second end frame component 116b includes a sixth eye bolt 144f at a corner of the second end frame component 116b adjacent or proximal to the second side frame component 114b and distal from or opposite to the base plate 102 (that is, at a distal end of the first stage 104 with respect to the base plate 102), the first end frame component 120a includes a seventh eye bolt 144g at a corner of the first end frame component 120a adjacent or proximal to the second side frame component 118b and proximal to the base plate 102 (that is, at a proximal end of the second stage 106 with respect to the base plate 102), and the second end frame component 120b includes an eighth eye bolt 144h at a corner of the second end frame component 120b adjacent or proximal to the second side frame component 118b and distal from or opposite to the base plate 102 (that is, at a distal end of the second stage 106 with respect to the base plate 102). FIG. 11 illustrates one eyebolt 144.

As illustrated in FIGS. 4 and 5 in particular, the system 100 includes a plurality of anchors or anchor points 146 configured to anchor cables or wires to the end frame components of the first, second, and third stages 104, 106, and 108, and to the block 130 of the fourth stage 110. For example, as illustrated in FIG. 4 in particular, the first end frame component 124a includes a first anchor point 146a at a corner of the first end frame component 124a adjacent or proximal to the first side frame component 122a and distal from or opposite to the base plate 102 (that is, at a distal end of the third stage 108 with respect to the base plate 102), the second end frame component 124b includes a second anchor point 146b at a corner of the second end frame component 124*b* adjacent or proximal to the first side frame component 122*a* and proximal to the base plate 102 (that is, at a proximal end of the third stage 108 with respect to the base plate 102), the block 130 includes a third anchor point 146*c* at a corner of the block 130 adjacent or proximal to the first side frame component 122*a* and adjacent or proximal to the first end frame component 124*a*, and the block 130 also includes a fourth anchor point 146*d* at a corner of the block 130 adjacent or proximal to the first side frame component 122*a* and adjacent or proximal to the second end frame component 124*b*.

As another example, as illustrated in FIG. 5 in particular, the first end frame component 124*a* includes a fifth anchor point 146*e* at a corner of the first end frame component 124*a* adjacent or proximal to the second side frame component 122*b* and proximal to the base plate 102 (that is, at a proximal end of the third stage 108 with respect to the base plate 102), the second end frame component 124*b* includes a sixth anchor point 146*f* at a corner of the second end frame component 124*b* adjacent or proximal to the second side frame component 122*b* and distal from or opposite to the base plate 102 (that is, at a distal end of the third stage 108 with respect to the base plate 102), the block 130 includes a seventh anchor point 146*g* at a corner of the block 130 adjacent or proximal to the second side frame component 122*b* and adjacent or proximal to the first end frame component 124*a*, and the block 130 also includes an eighth anchor point 146*h* at a corner of the block 130 adjacent or proximal to the second side frame component 122*b* and adjacent or proximal to the second end frame component 124*b*.

As illustrated in FIGS. 4 and 5 in particular, the system 100 includes a plurality of grooves 148, which may be provided in the form of pulleys, configured to change the direction of cables or wires extending between the end frame components of the first, second, and third stages 104, 106, and 108, and to the block 130 of the fourth stage 110. For example, as illustrated in FIG. 4 in particular, the first end frame component 120*a* includes a first groove 148*a* at a corner of the first end frame component 120*a* adjacent or proximal to the first side frame component 118*a* and proximal to the base plate 102 (that is, at a proximal end of the second stage 106 with respect to the base plate 102), the second end frame component 120*b* includes a second groove 148*b* at a corner of the second end frame component 120*b* adjacent or proximal to the first side frame component 118*a* and distal from or opposite to the base plate 102 (that is, at a distal end of the second stage 106 with respect to the base plate 102), the first end frame component 124*a* includes a third groove 148*c* at a corner of the first end frame component 124*a* adjacent or proximal to the first side frame component 122*a* and proximal to the base plate 102 (that is, at a proximal end of the third stage 108 with respect to the base plate 102), and the second end frame component 124*b* includes a fourth groove 148*d* at a corner of the second end frame component 124*b* adjacent or proximal to the first side frame component 122*a* and distal from or opposite to the base plate 102 (that is, at a distal end of the third stage 108 with respect to the base plate 102).

As another example, as illustrated in FIG. 5 in particular, the first end frame component 120*a* includes a fifth groove 148*e* at a corner of the first end frame component 120*a* adjacent or proximal to the second side frame component 118*b* and distal or opposite to the base plate 102 (that is, at a distal end of the second stage 106 with respect to the base plate 102), the second end frame component 120*b* includes a sixth groove 148*f* at a corner of the second end frame component 120*b* adjacent or proximal to the second side frame component 118*b* and proximal to the base plate 102 (that is, at a proximal end of the second stage 106 with respect to the base plate 102), the first end frame component 124*a* includes a seventh groove 148*g* at a corner of the first end frame component 124*a* adjacent or proximal to the second side frame component 122*b* and distal or opposite to the base plate 102 (that is, at a distal end of the third stage 108 with respect to the base plate 102), and the second end frame component 124*b* includes an eighth groove 148*h* at a corner of the second end frame component 124*b* adjacent or proximal to the second side frame component 122*b* and proximal to the base plate 102 (that is, at a proximal end of the third stage 108 with respect to the base plate 102).

Figure 12:
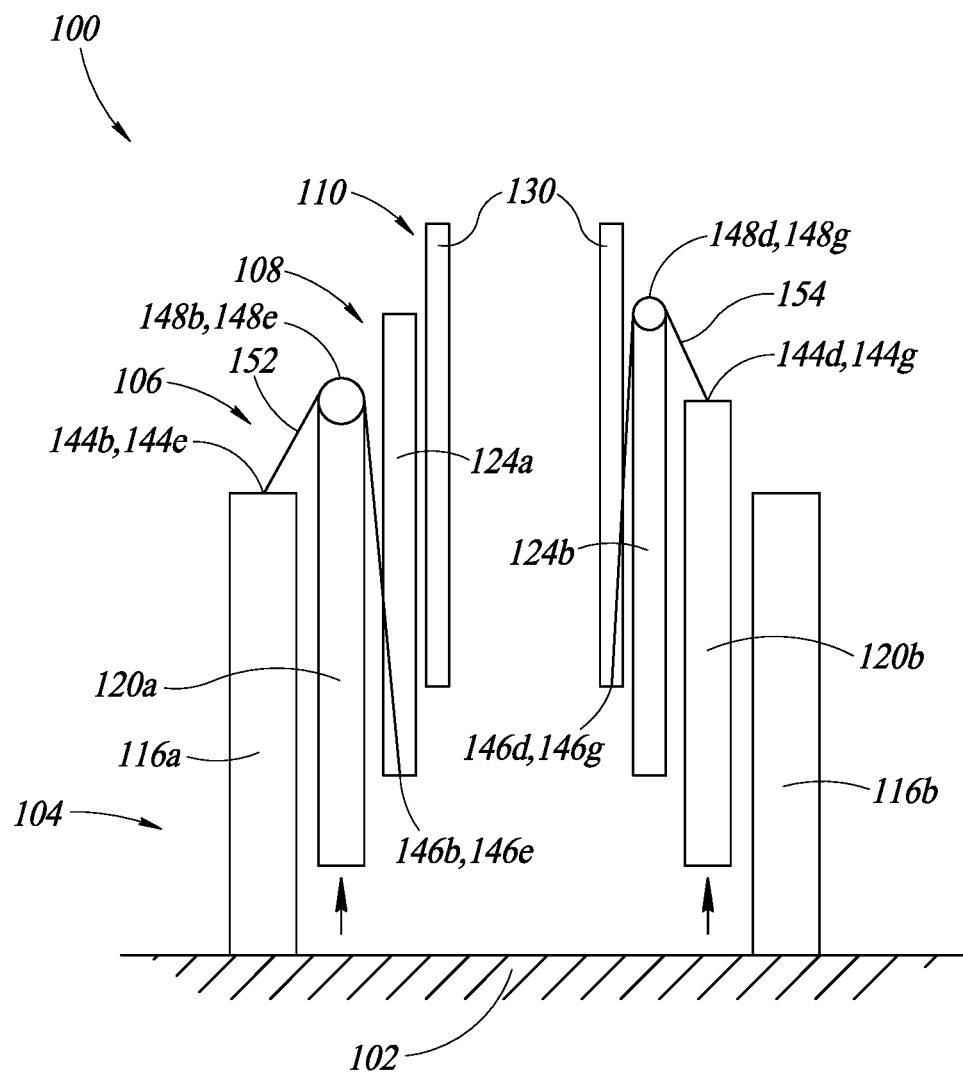
FIG. 12 is a schematic diagram illustrating a set of mechanical linkages between stages of the system of FIGS. 1-6.
Figure 13:
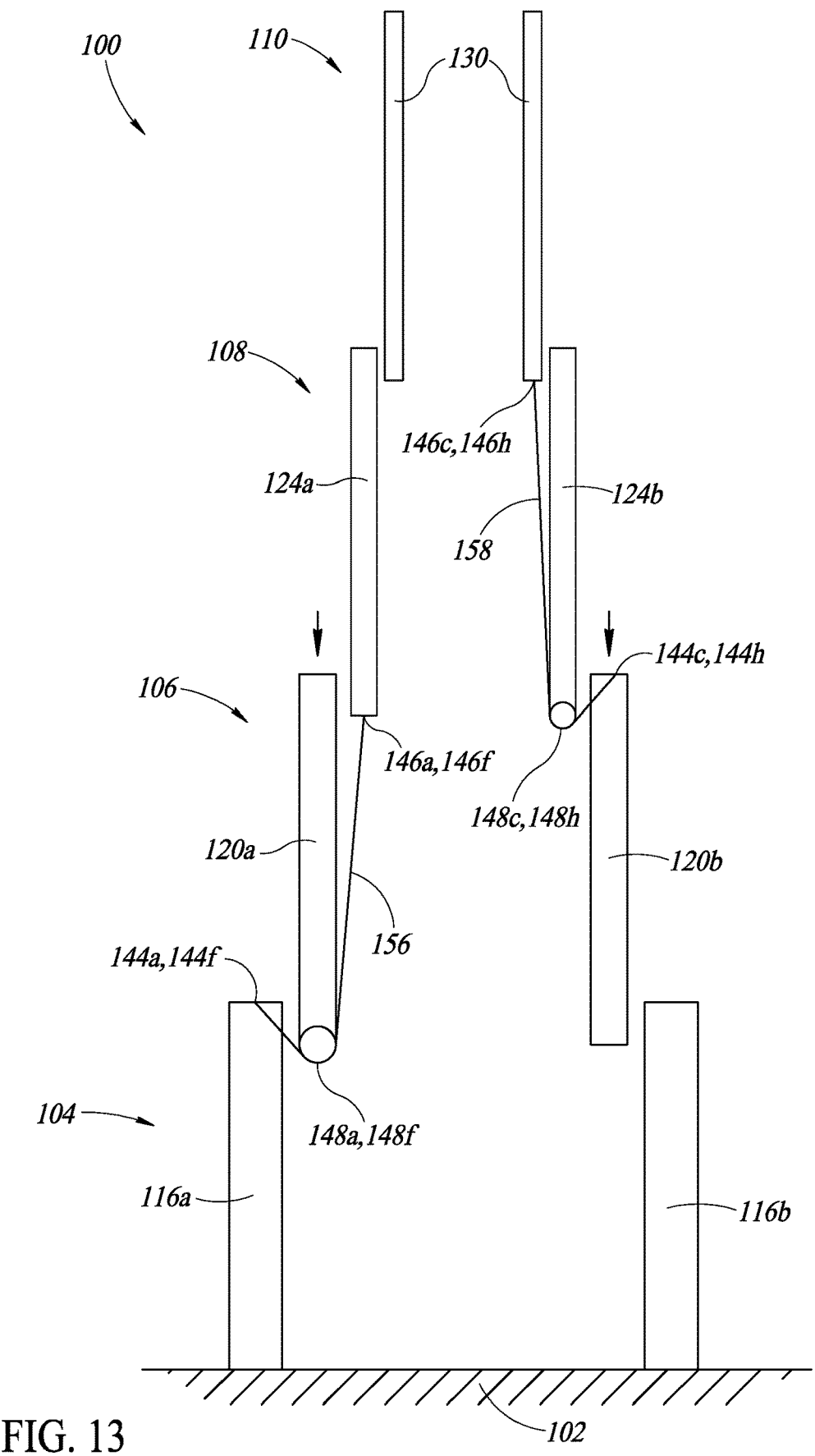
FIG. 13 is a schematic diagram illustrating another set of mechanical linkages between stages of the system of FIGS. 1-6.

FIGS. 12 and 13 illustrate schematic diagrams of two sets of mechanical linkages between the stages 104, 106, 108, and 110 that allow the system 100 to multiply the stroke of the overall system 100 with respect to a stroke of an actuator coupled to the first stage 104 and the second stage 106, such as at the fitting 134. For example, FIG. 12 illustrates a schematic diagram of a set of mechanical linkages between the stages 104, 106, 108, and 110 that allows the system 100 to multiply the stoke of the overall system 100 with respect to the stroke of the actuator as the actuator actuates the system 100 to extend or expand along the axis 112 in a direction away from the base plate 102 (that is, as the system 100 extends distally with respect to the base plate 102), and FIG. 13 illustrates a schematic diagram of a set of mechanical linkages between the stages 104, 106, 108, and 110 that allows the system 100 to multiply the stoke of the overall system 100 with respect to the stroke of the actuator as the actuator actuates the system 100 to retract or contract along the axis 112 in a direction toward the base plate 102 (that is, as the system 100 retracts proximally with respect to the base plate 102).

In particular, FIG. 12 illustrates that the system 100 includes a first cable 152 that is secured at a first end thereof to the first stage 104, such as to a first end frame component 116*a* thereof at an eye bolt 144*b*, 144*e* thereof. The first cable 152 is also secured, at a second end thereof opposite to its first end, to the third stage 108, such as to a first end frame component 124*a* thereof at an anchor point 146*b*, 146*e* thereof. The first cable 152 is also coupled, at an intermediate portion thereof between its first and second ends, to the second stage 106, such as to a first end frame component 120*a* thereof by extending through a groove 148*b*, 148*e*, such as of a pulley, thereof. As illustrated in FIG. 12, the first cable 152 extends over the groove 148*b*, 148*e* with respect to the base plate 102, in the sense that as the first cable 152 approaches the groove 148*b*, 148*e* from both the first end frame component 116*a* and the first end frame component 124*a*, the first cable 152 extends distally away from the base plate 102.

FIG. 12 also illustrates that the system 100 includes a second cable 154 that is secured at a first end thereof to the second stage 106, such as to a second end frame component 120*b* thereof at an eye bolt 144*d*, 144*g* thereof. The second cable 154 is also secured, at a second end thereof opposite to its first end, to the fourth stage 110, such as to the block 130 thereof at an anchor point 146*d*, 146*g* thereof. The second cable 154 is also coupled, at an intermediate portion thereof between its first and second ends, to the third stage 108, such as to a second end frame component 124*b* thereof by extending through a groove 148*d*, 148*g*, such as of a pulley, thereof. As illustrated in FIG. 12, the second cable 154 extends over the groove 148*d*, 148*g* with respect to the base plate 102, in the sense that as the second cable 154 approaches the groove 148d, 148g from both the second end frame component 120b and the block 130, the second cable 154 extends distally away from the base plate 102.

FIG. 13 illustrates that the system 100 includes a third cable 156 that is secured at a first end thereof to the first stage 104, such as to a first end frame component 116a thereof at an eye bolt 144a, 144f thereof. The third cable 156 is also secured, at a second end thereof opposite to its first end, to the third stage 108, such as to a first end frame component 124a thereof at an anchor point 146a, 146f thereof. The third cable 156 is also coupled, at an intermediate portion thereof between its first and second ends, to the second stage 106, such as to a first end frame component 120a thereof by extending through a groove 148a, 148f, such as of a pulley, thereof. As illustrated in FIG. 13, the third cable 156 extends under the groove 148a, 148f with respect to the base plate 102, in the sense that as the third cable 156 approaches the groove 148a, 148f from both the first end frame component 116a and the first end frame component 124a, the third cable 156 extends proximally toward the base plate 102.

FIG. 13 also illustrates that the system 100 includes a fourth cable 158 that is secured at a first end thereof to the second stage 106, such as to a second end frame component 120b thereof at an eye bolt 144c, 144h thereof. The fourth cable 158 is also secured, at a second end thereof opposite to its first end, to the fourth stage 110, such as to the block 130 thereof at an anchor point 146c, 146h thereof. The fourth cable 158 is also coupled, at an intermediate portion thereof between its first and second ends, to the third stage 108, such as to a second end frame component 124b thereof by extending through a groove 148c, 148h, such as of a pulley, thereof. As illustrated in FIG. 13, the fourth cable 158 extends under the groove 148c, 148h with respect to the base plate 102, in the sense that as the fourth cable 158 approaches the groove 148c, 148h from both the second end frame component 120b and the block 130, the fourth cable 158 extends proximally toward the base plate 102.

The first, second, third, and fourth cables 152, 154, 156, and 158 can be constant length cables, or inelastic, such that their length does not change, or undergoes an insignificant change, in response to tension forces applied during ordinary operation of the system 100. Dimensions of the first, second, third, and fourth cables 152, 154, 156, and 158, such as lengths and diameters thereof, can be determined based on specifications for the overall system 100 or a robotic arm or other system to which it is to be coupled or into which it is to be incorporated. For example, the system 100 may be provided with longer and thicker cables 152, 154, 156, and 158 if it is to be used with larger robotic arms or other systems, or shorter and narrower cables 152, 154, 156, and 158 if it is to be used with smaller robotic arms or other systems.

As can be seen from FIG. 12, the first and second cables 152, 154 are configured to multiply the stoke of the overall system 100 with respect to the stroke of the actuator as the actuator actuates the system 100 to extend or expand along the axis 112 in a direction away from the base plate 102 (that is, as the system 100 extends distally with respect to the base plate 102). In particular, as an actuator is used to actuate the second stage 106 to move distally with respect to the first stage 104 and the base plate 102, the length of the first cable 152 between the first stage 104 and the second stage 106 increases, and the length of the first cable 152 between the second stage 106 and the third stage 108 decreases accordingly, thereby forcing the third stage 108 to move distally with respect to the second stage 106. Similarly, as the third stage 108 moves distally with respect to the second stage 106, the length of the second cable 154 between the second stage 106 and the third stage 108 increases, and the length of the second cable 154 between the third stage 108 and the fourth stage 110 decreases accordingly, thereby forcing the fourth stage 110 to move distally with respect to the third stage 108.

As can be seen from FIG. 13, the third and fourth cables 156, 158 are configured to multiply the stoke of the overall system 100 with respect to the stroke of the actuator as the actuator actuates the system 100 to retract or contract along the axis 112 in a direction toward the base plate 102 (that is, as the system 100 retracts proximally with respect to the base plate 102). In particular, as the actuator is used to actuate the second stage 106 to move proximally with respect to the first stage 104 and the base plate 102, the length of the third cable 156 between the first stage 104 and the second stage 106 increases, and the length of the third cable 156 between the second stage 106 and the third stage 108 decreases accordingly, thereby forcing the third stage 108 to move proximally with respect to the second stage 106. Similarly, as the third stage 108 moves proximally with respect to the second stage 106, the length of the fourth cable 158 between the second stage 106 and the third stage 108 increases, and the length of the fourth cable 158 between the third stage 108 and the fourth stage 110 decreases accordingly, thereby forcing the fourth stage 110 to move proximally with respect to the third stage 108.

Figure 14:
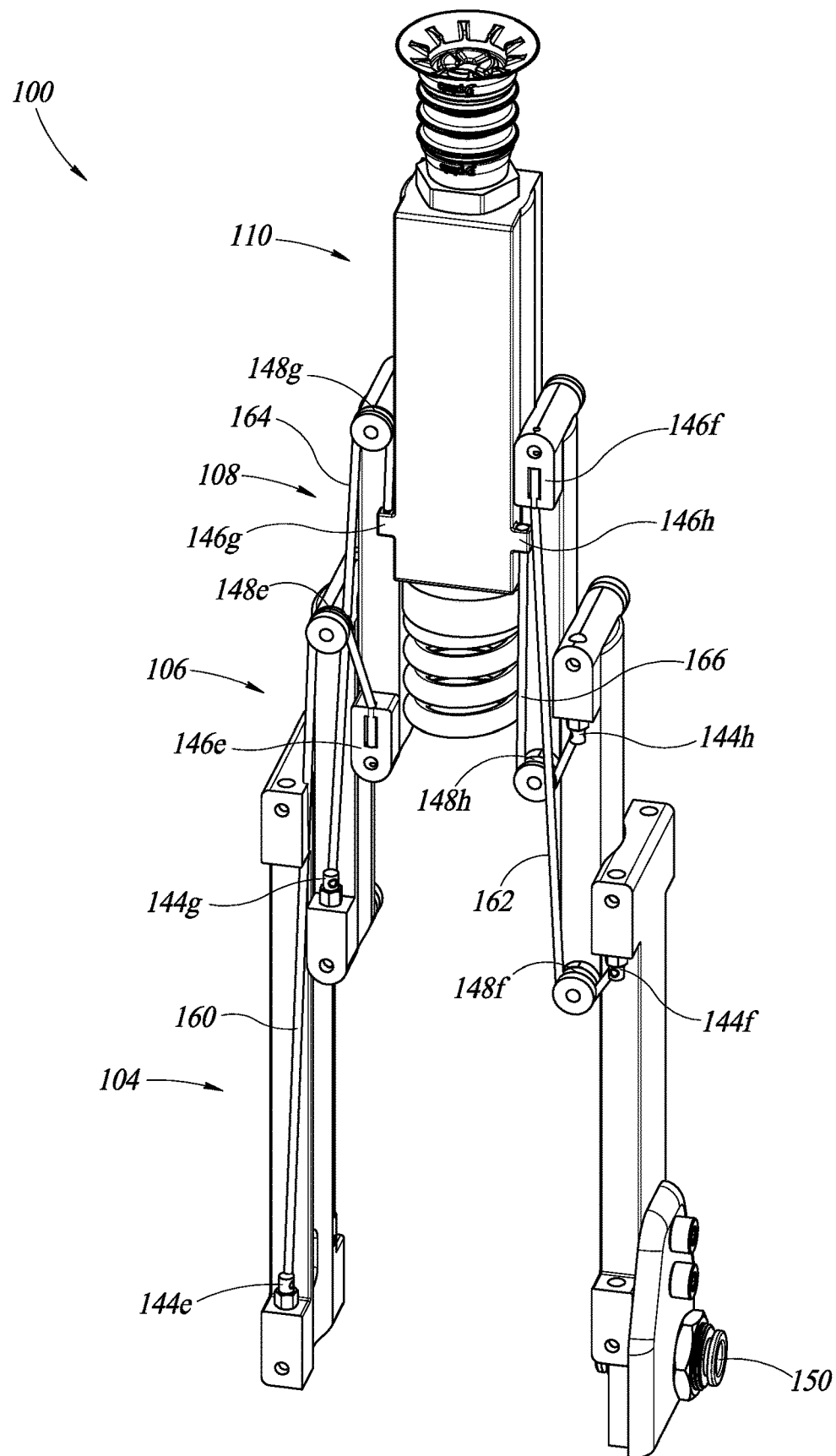
FIG. 14 illustrates a perspective view of another embodiment of a system including a nested linear stroke multiplier for a robotic manipulator, according to an embodiment of the present disclosure.

FIG. 14 illustrates another embodiment of the system 100 with cables attached thereto in a manner different than that illustrated in FIGS. 12 and 13, but such that they function in a manner similar to that described with respect to FIGS. 12 and 13.

In particular, FIG. 14 illustrates that a fifth cable 160 extends from the fifth eye bolt 144e, over the fifth groove 148e, to the fifth anchor point 146e, a sixth cable 162 extends from the sixth eye bolt 144f, under the sixth groove 148f, to the sixth anchor point 146f, a seventh cable 164 extends from the seventh eye bolt 144g, over the seventh groove 148g, to the seventh anchor point 146g, and an eighth cable 166 extends from the eighth eye bolt 144h, under the eighth groove 148h, to the eighth anchor point 146h.

As can be seen from FIG. 14, the fifth and seventh cables 160, 164 are configured to multiply the stoke of the overall system 100 with respect to the stroke of the actuator as the actuator actuates the system 100 to extend or expand along the axis 112 in a direction away from the base plate 102 (that is, as the system 100 extends distally with respect to the base plate 102). In particular, as an actuator is used to actuate the second stage 106 to move distally with respect to the first stage 104 and the base plate 102, the length of the fifth cable 160 between the first stage 104 and the second stage 106 increases, and the length of the fifth cable 160 between the second stage 106 and the third stage 108 decreases accordingly, thereby forcing the third stage 108 to move distally with respect to the second stage 106. Similarly, as the third stage 108 moves distally with respect to the second stage 106, the length of the seventh cable 164 between the second stage 106 and the third stage 108 increases, and the length of the seventh cable 164 between the third stage 108 and the fourth stage 110 decreases accordingly, thereby forcing the fourth stage 110 to move distally with respect to the third stage 108.

Similarly, the sixth and eighth cables 162, 166 are configured to multiply the stoke of the overall system 100 with respect to the stroke of the actuator as the actuator actuates the system 100 to retract or contract along the axis 112 in a direction toward the base plate 102 (that is, as the system 100 retracts proximally with respect to the base plate 102). In particular, as the actuator is used to actuate the second stage 106 to move proximally with respect to the first stage 104 and the base plate 102, the length of the sixth cable 162 between the first stage 104 and the second stage 106 increases, and the length of the sixth cable 162 between the second stage 106 and the third stage 108 decreases accordingly, thereby forcing the third stage 108 to move proximally with respect to the second stage 106. Similarly, as the third stage 108 moves proximally with respect to the second stage 106, the length of the eighth cable 166 between the second stage 106 and the third stage 108 increases, and the length of the eighth cable 166 between the third stage 108 and the fourth stage 110 decreases accordingly, thereby forcing the fourth stage 110 to move proximally with respect to the third stage 108.

In some embodiments, in addition to the first, second, third, and fourth cables 160, 162, 164, and 166, the system 100 includes a first cable that extends from the first eye bolt 144a, under the first groove 148a, to the first anchor point 146a, a second cable that extends from the second eye bolt 144b, over the second groove 148b, to the second anchor point 146b, a third cable that extends from the third eye bolt 144c, under the third groove 148c, to the third anchor point 146c, and a fourth cable that extends from the fourth eye bolt 144d, over the fourth groove 148d, to the fourth anchor point 146d.

In such embodiments, the second and fourth cables are configured to multiply the stoke of the overall system 100 with respect to the stroke of the actuator as the actuator actuates the system 100 to extend or expand along the axis 112 in a direction away from the base plate 102 (that is, as the system 100 extends distally with respect to the base plate 102). In particular, as an actuator is used to actuate the second stage 106 to move distally with respect to the first stage 104 and the base plate 102, the length of the second cable between the first stage 104 and the second stage 106 increases, and the length of the second cable between the second stage 106 and the third stage 108 decreases accordingly, thereby forcing the third stage 108 to move distally with respect to the second stage 106. Similarly, as the third stage 108 moves distally with respect to the second stage 106, the length of the fourth cable between the second stage 106 and the third stage 108 increases, and the length of the fourth cable between the third stage 108 and the fourth stage 110 decreases accordingly, thereby forcing the fourth stage 110 to move distally with respect to the third stage 108.

Similarly, in such embodiments, the first and third cables are configured to multiply the stoke of the overall system 100 with respect to the stroke of the actuator as the actuator actuates the system 100 to retract or contract along the axis 112 in a direction toward the base plate 102 (that is, as the system 100 retracts proximally with respect to the base plate 102). In particular, as the actuator is used to actuate the second stage 106 to move proximally with respect to the first stage 104 and the base plate 102, the length of the first cable between the first stage 104 and the second stage 106 increases, and the length of the first cable between the second stage 106 and the third stage 108 decreases accordingly, thereby forcing the third stage 108 to move proximally with respect to the second stage 106. Similarly, as the third stage 108 moves proximally with respect to the second stage 106, the length of the third cable between the second stage 106 and the third stage 108 increases, and the length of the third cable between the third stage 108 and the fourth stage 110 decreases accordingly, thereby forcing the fourth stage 110 to move proximally with respect to the third stage 108.

Thus, the first, second, third, and fourth cables are sufficient for operation of the system 100 without the fifth, sixth, seventh, and eighth cables 160, 162, 164, and 166, and the fifth, sixth, seventh, and eighth cables 160, 162, 164, and 166 are sufficient for operation of the system 100 without the first, second, third, and fourth cables. Thus, in such embodiments, there are two, redundant sets of cables for actuating the stages of the system 100 with respect to one another.

In one alternative embodiment, the system 100 may be provided only with cables that facilitate the extension or expansion of the system 100, that is, the distal movement of stage 108 with respect to stage 106 and the distal movement of stage 110 with respect to stage 108. In such an embodiment, the system 100 may also be provided with a spring, elastic band, or other component that passively biases the system toward a retracted, contracted configuration, that biases the stage 110 to move proximally toward the stage 108, that biases the stage 108 to move proximally toward the stage 106, and that biases the stage 106 to move proximally toward the stage 104.

In another alternative embodiment, the system 100 may be provided only with cables that facilitate the retraction or contraction of the system 100, that is, the proximal movement of stage 110 with respect to stage 108 and the proximal movement of stage 108 with respect to stage 106. In such an embodiment, the system 100 may also be provided with a spring, elastic band, or other component that passively biases the system toward an extended, expanded configuration, that biases the stage 106 to move distally away from the stage 104, that biases the stage 108 to move distally away from the stage 106, and that biases the stage 110 to move distally away from the stage 108.

Figure 15:
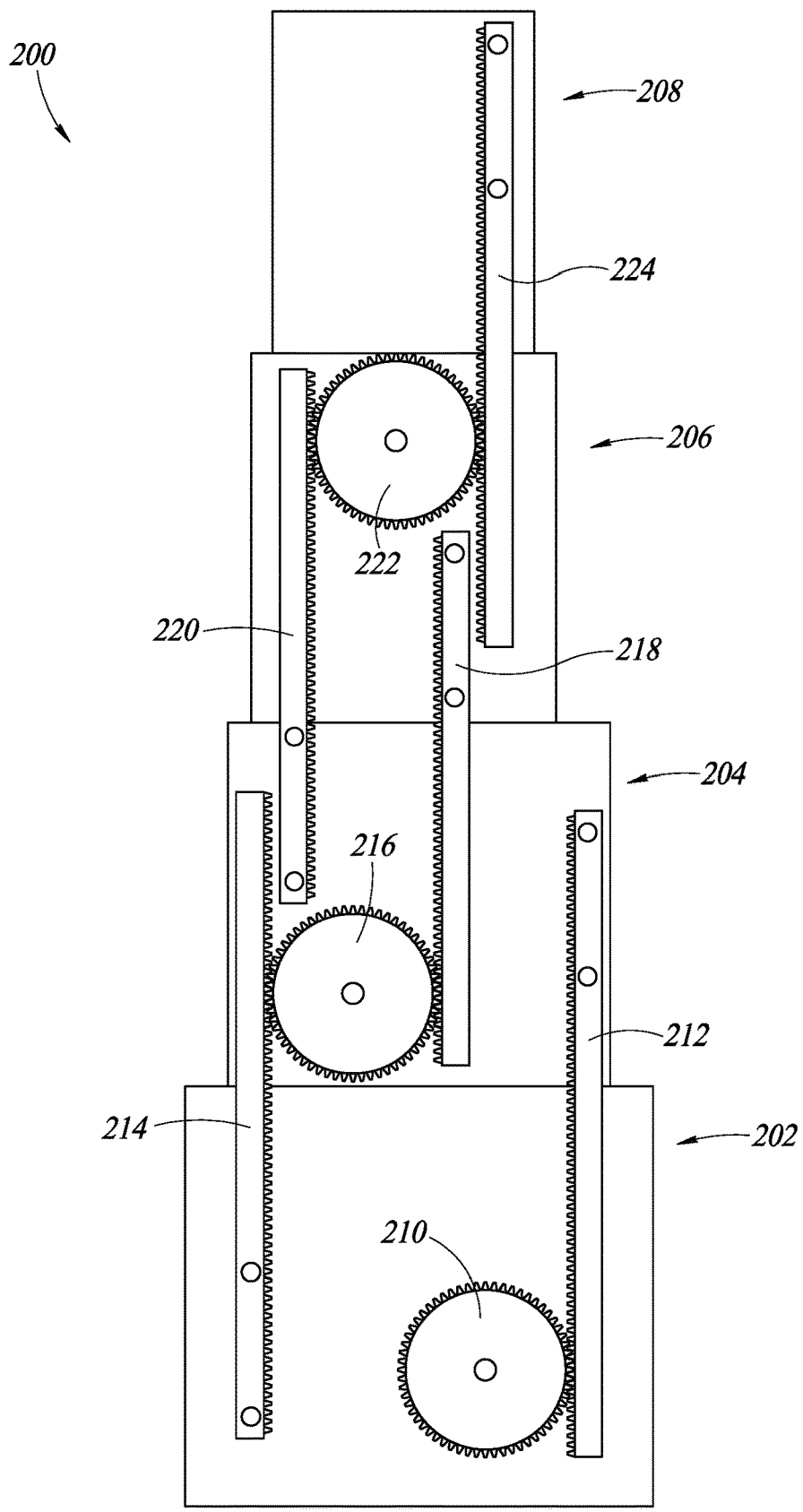
FIG. 15 is a schematic diagram illustrating a set of mechanical linkages between stages of another embodiment of a system including a nested linear stroke multiplier for a robotic manipulator, according to an embodiment of the present disclosure.

FIG. 15 illustrates a set of mechanical linkages between stages of another embodiment of a system 200 including a nested linear stroke multiplier for a robotic manipulator. As illustrated in FIG. 15, the system 200 includes a first, base stage 202, a second stage 204, a third stage 206, and a fourth stage 208, as well as rack and pinion mechanisms rather than cables to form the linkages between the stages 202, 204, 206, and 208. The first, base stage 202 may be considered a stationary stage, as described elsewhere herein with respect to the base plate 102 and the first, base stage 104.

As illustrated in FIG. 15, the first stage 202 includes a first pinion 210 that can be actuated to rotate in either direction about its own central longitudinal axis with respect to the rest of the first stage 202 by any suitable actuator. As further illustrated in FIG. 15, the second stage 204 includes or is rigidly coupled to a first rack 212 that extends to overlap with the first stage 202 and engage with the first pinion 210. As the first pinion 210 rotates counter-clockwise as viewed in FIG. 15, the first rack 212, and thus the entire second stage 204, is actuated to move rightward as viewed in FIG. 15, distally away from the first stage 202.

The first stage 202 also includes or is rigidly coupled to a second rack 214 that extends to overlap with the second stage 204. The second stage 204 includes a second pinion 216 that is engaged with the second rack 214 such that as the second stage 204, including the second pinion 216, move with respect to the first stage 202 and the second rack 214, the second rack 214 actuates the second pinion 216 to rotate about its own central longitudinal axis with respect to the rest of the second stage 204. As further illustrated in FIG. 15, the third stage 206 includes or is rigidly coupled to a third rack 218 that extends to overlap with the second stage 204 and engage with the second pinion 216. As the second pinion 216 rotates counter-clockwise with respect to the rest of the second stage 204 as viewed in FIG. 15, the third rack 218, and thus the entire third stage 206, is actuated to move rightward as viewed in FIG. 15, distally away from the second stage 204.

The second stage 204 also includes or is rigidly coupled to a fourth rack 220 that extends to overlap with the third stage 206. The third stage 206 includes a third pinion 222 that is engaged with the fourth rack 220 such that as the third stage 206, including the third pinion 222, move with respect to the second stage 204 and the fourth rack 220, the fourth rack 220 actuates the third pinion 222 to rotate about its own central longitudinal axis with respect to the rest of the third stage 206. As further illustrated in FIG. 15, the fourth stage 208 includes or is rigidly coupled to a fifth rack 224 that extends to overlap with the third stage 206 and engage with the third pinion 222. As the third pinion 222 rotates counter-clockwise with respect to the rest of the third stage 206 as viewed in FIG. 15, the fifth rack 224, and thus the entire fourth stage 208, is actuated to move rightward as viewed in FIG. 15, distally away from the third stage 206.

In some embodiments, the system 200 may include additional gears, such that the racks and pinions may be geared up or down with respect to the first pinion 210. For example, the racks and pinions of the system 200 may be geared up or down to increase or decrease an extension or travel of the stages 202, 204, 206, and 208 with respect to one another, or to increase or decrease a force with which the stages 202, 204, 206, and 208 are capable of moving with respect to one another.

The systems 100 and 200 include different mechanical components, but each allow a robotic manipulator to be actuated by an actuator in a way that the total distance the system 100 extends when actuated is a multiple of the distance traveled by the actuator itself. Further, in each of systems 100 and 200, such multiplication is achieved passively, that is, without any additional actuators or additional input of external energy. Such passive actuation of the stages of the systems 100 and 200 is advantageous at least because it saves space by allowing the full actuation to be achieved by a single, relatively small actuator. For example, in the illustrated embodiments, the systems 100 and 200 each allow a robotic manipulator to be actuated by an actuator such that the total distance the system 100 or 200 extends when actuated is three times a distance traveled by the actuator itself. In alternative embodiments, however, the multiple may be more or less than three times, such as two times, four times, five times, six times, eight times, ten times, etc. Such other multiples may be achieved by using fewer or more stages than described and illustrated herein for the systems 100 and 200.

A method may comprise extending an initially retracted system 100 or 200, such as until the suction cup 126 thereof contacts and engages with an object to be held by the system 100, 200. A vacuum may be supplied to the suction cup 126 to increase a force exerted by the suction cup 126 against the object. The system 100, 200 may be used to hold the object while the object is moved around in space of otherwise manipulated or operated on. The vacuum can be removed from the suction cup and the object can then be released from the system 100, 200. The system 100, 200 may then be actuated to retract, such as to move the suction cup 126 away from the object. Such actions and operations of the systems 100, 200 may be manually controlled by a human operator, or automated.

The systems 100, 200 can be used with robotic manipulators, and may be configured to fit within a gripper palm of a robotic manipulator. For example, the systems 100, 200 may be incorporated into robotic manipulators that also include grippers or other features and components described in U.S. patent application Ser. No. 16/681,667, filed Nov. 12, 2019, which is hereby incorporated herein by reference in its entirety. In such embodiments, a robotic manipulator may include a pair of underactuated robotic fingers as described therein, and one of the systems 100, 200 described herein positioned between the fingers. In such embodiments, the systems 100, 200 can be configured to extend the suction cup 126 to extend beyond the distal ends of the fingers. In one specific example, the systems 100, 200 may include an actuator capable of providing 60 mm of travel in less than 1.0 seconds, such as within 0.6 seconds, and the systems 100, 200 may be capable of converting such action into 180 mm of total travel for the suction cup 126.

The systems 100, 200 can be used with robotic manipulators on assembly lines or in storage spaces such as bins, boxes, sorting stations, rooms, or other spaces or volumes used to store, hold, warehouse, or otherwise contain objects. In some embodiments, the systems 100, 200 can be used with robotic manipulators in retail supply chain warehouses, where objects to be manipulated include apparel, consumer goods, merchandise, etc. In other embodiments, the systems 100, 200 can be used with robotic manipulators to hold or manipulate tools, parts, components, packages, letters, foodstuffs, etc., such as in pick-and-place, gripping, identification, and/or sorting operations.

The systems 100, 200 can be used in conjunction with reinforced learning ("RL") techniques, so that over time, the systems 100, 200 can intelligently predict when a particular type, size, or shape of object may require supplemental securement, such as by the suction cup 126. The systems 100, 200 can proactively extend or retract the suction cup 126 and apply a vacuum immediately upon determining that a target object would likely require such supplemental securement, such as based on learned data. This could reduce the time to determine if such features should be used, as well as reduce the time to execute object securement functions. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A robotic manipulator, comprising:
   a first stage;
   a second stage;
   a third stage;
   a fourth stage configured to translate linearly with respect to the third stage;
   a gripper coupled to a distal end of the fourth stage;
   an actuator coupled to the first stage and to the second stage to actuate proximal movement of the second stage with respect to the first stage and to actuate distal movement of the second stage with respect to the first stage;
   a first cable having a first end coupled to the first stage, a second end coupled to the third stage, and an intermediate portion between the first end and the second end engaged with the second stage such that the distal movement of the second stage with respect to the first stage passively drives distal movement of the third stage with respect to the second stage; and a second cable having a first end coupled to the first stage, a second end coupled to the third stage, and an intermediate portion between the first end and the second end engaged with the second stage such that the proximal movement of the second stage with respect to the first stage passively drives proximal movement of the third stage with respect to the second stage.

2. The robotic manipulator of claim 1 wherein the distal movement of the second stage with respect to the first stage is linear movement and the distal movement of the third stage with respect to the second stage is linear movement.

3. The robotic manipulator of claim 2 wherein the linear movement of the second stage with respect to the first stage is in the same direction as the linear movement of the third stage with respect to the second stage.

4. The robotic manipulator of claim 1, further comprising:
a third cable having a first end coupled to the second stage, a second end coupled to the fourth stage, and an intermediate portion between the first end and the second end engaged with the third stage such that the distal movement of the third stage with respect to the second stage passively drives distal movement of the fourth stage with respect to the third stage.

5. The robotic manipulator of claim 1 wherein the intermediate portion of the first cable is positioned within a groove in the second stage.

6. The robotic manipulator of claim 5 wherein the groove is located within a pulley in the second stage.

\* \* \* \* \*

UNITED STATES PATENT AND TRADEMARK OFFICE
CERTIFICATE OF CORRECTION

| | | |
|---|---|---|
| PATENT NO. | : 12,042,933 B2 | Page 1 of 1 |
| APPLICATION NO. | : 16/752358 | |
| DATED | : July 23, 2024 | |
| INVENTOR(S) | : Nicholas Keyes et al. | |

It is certified that error appears in the above-identified patent and that said Letters Patent is hereby corrected as shown below:

On the Title Page

<u>Item (71) Applicant:</u>
"(71) Applicant: Kindred Systems Inc., San Francisco, CA (US)"
Should read:
--(71) Applicant: Ocado Innovation Limited, Hatfield, (GB)--.

Signed and Sealed this
Eighth Day of April, 2025

Coke Morgan Stewart
*Acting Director of the United States Patent and Trademark Office*